United States Patent
Baker et al.

(10) Patent No.: US 7,409,623 B2
(45) Date of Patent: *Aug. 5, 2008

(54) SYSTEM AND METHOD OF READING NON-VOLATILE COMPUTER MEMORY

(75) Inventors: David Cureton Baker, Austin, TX (US); Grayson Dale Abbott, Pflugerville, TX (US); Josef Zeevi, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/981,086

(22) Filed: Nov. 4, 2004

(65) Prior Publication Data

US 2006/0107130 A1    May 18, 2006

(51) Int. Cl.
*G11C 29/00* (2006.01)
(52) U.S. Cl. ...................................... 714/763
(58) Field of Classification Search ................. 711/168, 711/163
See application file for complete search history.

(56) References Cited

U.S. PATENT DOCUMENTS

| | | | |
|---|---|---|---|
| 5,535,369 A | 7/1996 | Wells et al. | |
| 5,544,356 A | 8/1996 | Robinson et al. | |
| 5,586,285 A | 12/1996 | Hasbun et al. | |
| 5,592,669 A | 1/1997 | Robinson et al. | |
| 5,630,093 A | 5/1997 | Holzhammer et al. | |
| 5,734,816 A * | 3/1998 | Niijima et al. | 714/8 |
| 5,740,395 A | 4/1998 | Wells et al. | |
| 5,754,566 A * | 5/1998 | Christopherson et al. | 714/773 |
| 5,875,477 A * | 2/1999 | Hasbun et al. | 711/162 |
| 5,963,983 A | 10/1999 | Sakakura et al. | |
| 6,295,619 B1 | 9/2001 | Hasbun et al. | |
| 6,317,281 B1 | 11/2001 | Ogawa et al. | |
| 6,397,273 B2 | 5/2002 | Chilton | |
| 6,426,916 B2 | 7/2002 | Farmwald et al. | |
| 6,487,631 B2 | 11/2002 | Dickinson et al. | |
| 6,601,140 B1 | 7/2003 | Okaue et al. | |
| 6,601,211 B1 | 7/2003 | Norman | |
| 6,735,726 B2 | 5/2004 | Muranaka et al. | |
| 6,754,117 B2 | 6/2004 | Jeddeloh | |
| 6,781,895 B1 | 8/2004 | Tanaka et al. | |
| 6,820,203 B1 * | 11/2004 | Okaue et al. | 713/193 |
| 6,883,131 B2 * | 4/2005 | Acton | 714/755 |
| 7,017,099 B2 * | 3/2006 | Micheloni et al. | 714/752 |
| 7,047,381 B2 * | 5/2006 | Bushner | 711/163 |
| 7,096,406 B2 * | 8/2006 | Kanazawa et al. | 714/763 |
| 7,111,190 B2 * | 9/2006 | Venkatraman et al. | 714/6 |

(Continued)

FOREIGN PATENT DOCUMENTS

JP    2001175490 A    6/2001

(Continued)

*Primary Examiner*—Shelly Chase
*Assistant Examiner*—Sam Rizk
(74) *Attorney, Agent, or Firm*—Toler Law Group, Intellectual Properties

(57) ABSTRACT

The disclosure is directed to a method of reading a portion of a non-volatile computer memory including reading a first portion of a redundant memory area of a data sector of the non-volatile computer memory. The first portion of the redundant memory area includes data associated with the data sector. The first portion of the redundant memory area includes a cyclic redundancy check code.

25 Claims, 3 Drawing Sheets

U.S. PATENT DOCUMENTS

| | | | |
|---|---|---|---|
| 7,162,668 B2 * | 1/2007 | Roohparvar | 714/710 |
| 7,168,013 B2 * | 1/2007 | Roohparvar | 714/710 |
| 2002/0172081 A1 * | 11/2002 | Mukaida et al. | 365/200 |
| 2004/0243885 A1 * | 12/2004 | James et al. | 714/42 |
| 2005/0038954 A1 * | 2/2005 | Saliba | 711/100 |
| 2005/0055621 A1 * | 3/2005 | Adelmann et al. | 714/758 |
| 2005/0086574 A1 * | 4/2005 | Fackenthal | 714/766 |
| 2005/0120163 A1 * | 6/2005 | Chou et al. | 711/103 |
| 2005/0149812 A1 * | 7/2005 | Hall et al. | 714/746 |

FOREIGN PATENT DOCUMENTS

| | | |
|---|---|---|
| TW | 90102875 | 6/2004 |
| TW | 93101054 | 10/2004 |
| WO | WO 01/98872 A3 | 12/2001 |

* cited by examiner

400

```
READING A FIRST PORTION OF A FIRST REDUNDANT MEMORY
AREA, THE FIRST PORTION INCLUDING A FIRST PART THAT
INCLUDES A FIRST CRC CODE
                        402
```

```
DETERMINING WHETHER A MEMORY ERROR IS DETECTED BY
EVALUATING THE FIRST CRC CODE
                        404
```

```
READING A FIRST PORTION OF A SECOND REDUNDANT MEMORY
AREA, THE FIRST PORTION INCLUDING A FIRST PART THAT
INCLUDES A SECOND CRC CODE
                        406
```

```
DETERMINING WHETHER A MEMORY ERROR IS DETECTED BY
EVALUATING THE SECOND CRC CODE
                        408
```

```
READING THE FIRST PORTION OF A REDUNDANT MEMORY AREA,
THE FIRST PORTION OF THE FIRST REDUNDANT MEMORY
PORTION INCLUDING A FIRST ECC AND THE SECOND PORTION
OF THE REDUNDANT MEMORY PORTION INCLUDING A SECOND
ERROR CORRECTION CODE
                        502
```

```
PERFORMING ERROR DETECTION OR CORRECTION USING THE
FIRST ECC
                        504
```

```
UPON DETECTION OF ERROR CONDITION, PERFORM ERROR
DETECTION OR CORRECTION USING A SECOND ECC
                        506
```

FIG. 5

SYSTEM AND METHOD OF READING NON-VOLATILE COMPUTER MEMORY

FIELD OF THE DISCLOSURE

This disclosure, in general, relates to systems and methods for reading non-volatile computer memory.

BACKGROUND

Increasingly, consumers are demanding portable devices, such as personal digital assistants (PDA's), MP3 players, portable memory systems, advanced cell phone systems, and cameras. Traditional non-volatile memory storage systems, such as floppy disks, hard drives, and optical drives, are generally unsuitable for use in portable devices because they suffer from mechanical failures, excess weight, large size and high energy consumption. As a result, manufacturers of portable devices are turning to solid-state memory systems, such as flash memory and electrically erasable, programmable read-only memory (EEPROM).

Accessing and storing data on solid-state memory devices, such as flash memory, utilizes virtualized addressing. Solid-state memory devices tend to wear with use and, as such, sectors within a solid-state memory device may lose the capacity to store error free data. To reduce the problem of solid-state memory wear, microcontrollers generally balance usage between sectors of the memory. For example, when data is provided to a flash memory device it may be stored in a first sector and when the data is updated the microcontroller may store the data in a second sector, reducing wear on the first sector. As a result, the physical location of a block of data may change. To facilitate this balancing and to address changing physical addresses, microcontrollers generally create a table that is used to convert location based addresses used by computational systems to the virtual addresses used within the flash memory devices. In this manner, a system may address a set of data using the same location based address while a microcontroller may store that information in changing sectors of the flash memory or at different addresses within the flash memory depending upon the balancing protocols. When a sector turns bad within the flash memory device, the microcontroller may create a mapping of bad data sectors to prevent storage of data in such bad data sectors.

The cataloging of bad sectors and creation of sector maps is typically performed by reading a data sector and checking for particular code values in the system data. Generally, an ECC associated with all of the data of a data sector is included in a data sector for use in correcting and checking for noise in the data. For example, an ECC is calculated based on data when the data is stored and is stored with the data. When the data is accessed, a new ECC is calculated from the data and compared to the ECC stored with the data. If there is a difference between the new ECC and the stored ECC, the data is likely corrupted and the sector may be bad. In many examples, ECCs may be used to correct the data before transmission to subsequent memory systems or processors.

Such error detection, error correction, and cataloging of bad data blocks is of increased importance for multi-level cell flash. Multi-level cell (MLC) flash has a greater storage density than traditional single level cell flash. However, multi-level cell flash typically has higher error rates and may wear faster. As such, error correction and sector cataloging are increasingly useful for non-volatile solid-state memory devices.

However, the process of reading the data, calculating ECCs and correcting corrupted data is a lengthy process. As such, performing tasks, such as mapping data sectors, consumes system resources. In one example, mapping tasks may reduce performance of connected memory buses. As such, there is a need for an improved system and method for reading non-volatile memory.

BRIEF DESCRIPTION OF THE DRAWINGS

FIGS. 3, 4 and 5 are flow diagrams illustrating exemplary methods for use by memory systems, such as the memory system exemplified in FIG. 1.

DETAILED DESCRIPTION OF DRAWINGS

Figure 1:
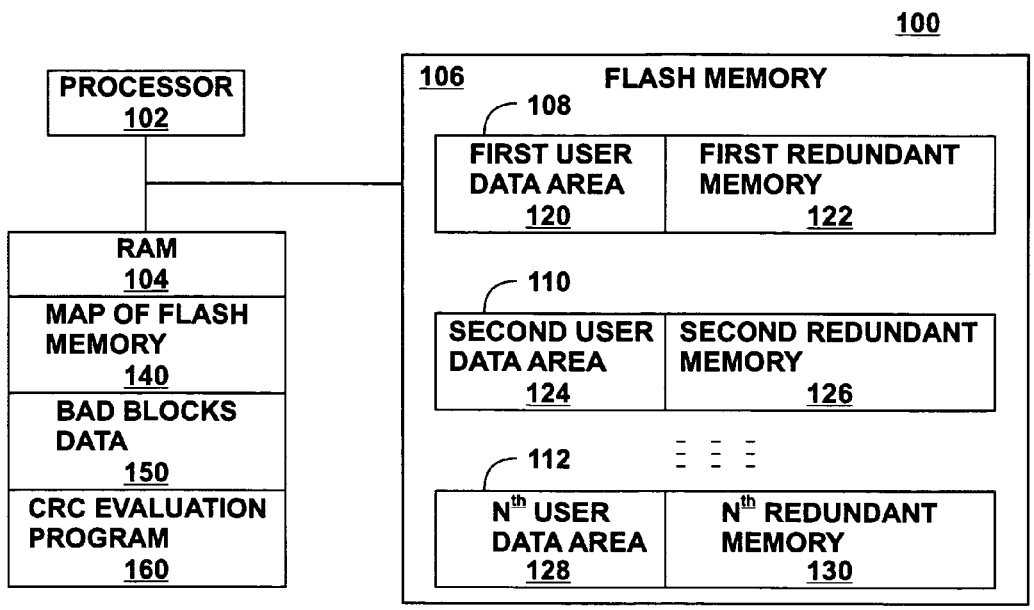
FIG. 1 is a block diagram illustrating an exemplary memory system.

In a particular embodiment, the disclosure is directed to memory systems including a processor and a non-volatile memory device. The non-volatile memory device is configured to store blocks of data including data sectors or pages. Each sector or page of data includes a user data area and a redundant memory area. Each redundant memory area includes a first portion that includes a cyclic redundancy checking code (CRC) and a second portion that includes an error correction code (ECC). When creating a mapping of flash memory, the system may read the first portion of each redundant memory area and check for errors using an associated cyclic redundancy checking (CRC) code. If the data of the redundant portion is found to be in error, the system may perform a data correction using the stored ECC code on the redundant memory area or on the whole data sector.

For example, the first portion of the redundant memory area may include system data and data useful for cataloging data blocks, such as one or more of overwrite flags, logical address data, format reserve data, security codes, data management flags, and tags identifying the kind of data in the sector. In one exemplary embodiment, overwrite flags include flags for indicating block status, page status, and update status. In one exemplary embodiment, the system scans the first portions of all data sectors or particular sectors in all blocks to check a block/sector status to build a list of good or bad sectors or blocks. In another example, the system scans a set of sectors for logical address information to build a logical-to-physical address map. In a further example, the system scans sectors in search of a particular tag. In another example, the system checks a security code before allowing the sector to be copied to another memory (i.e. copy-protection). For example, a CRC code may be included with the first portion to facilitate testing of the first portion to determine whether an error or noise is included in the flags or data.

In one exemplary embodiment, the disclosure is directed to a method of reading a portion of a non-volatile computer memory including reading a first portion of a redundant memory area associated with a data sector of the non-volatile computer memory. The first portion of the redundant memory area includes data associated with the data sector. The first portion of the redundant memory area includes a cyclic redundancy check code.

In another exemplary embodiment, the disclosure is directed to a method of reading a non-volatile computer memory. The method includes reading a first portion of a first redundant memory area of a first data sector of the non-volatile computer memory and reading a first portion of a second redundant memory area. The first redundant memory area includes data associated with the first data sector. The first portion of the first redundant memory area includes a first cyclic redundancy check code associated with the first portion of the first redundancy memory area. The method also includes reading a first portion of a second redundant memory area of a second data sector of the non-volatile computer memory. The second redundant memory area includes data associated with the second data sector. The first portion of the second redundant memory area includes a second cyclic redundancy check code.

In a further exemplary embodiment, the disclosure is directed to a non-volatile computer memory device including a first memory element including a first user data and a first redundant memory. The first redundant memory includes a first portion and a second portion. The first portion of the first redundant memory includes a first cyclic redundancy check code and the second portion of the first redundant memory includes a first error correction code. The non-volatile computer memory device also includes a second memory element including a second user data and a second redundant memory. The second redundant memory includes a first portion and a second portion. The first portion of the second redundant memory includes a second cyclic redundancy check code and the second portion of the second redundant memory includes a second error correction code.

In another exemplary embodiment, the disclosure is directed to a system including a processor, a dynamic memory accessible to the processor and a non-volatile memory accessible to the processor. The non-volatile memory includes a first memory element including a first user data and a first redundant memory. The first redundant memory includes a first portion and a second portion. The first portion of the first redundant memory includes a first cyclic redundancy check code and the second portion of the first redundant memory includes a first error correction code. The non-volatile memory also includes a second memory element including a second user data and a second redundant memory. The second redundant memory includes a first portion and a second portion. The first portion of the second redundant memory includes a second cyclic redundancy check code and the second portion of the second redundant memory includes a second error correction code.

FIG. 1 illustrates an exemplary memory system 100. The exemplary memory system 100 includes a processor 102 and a non-volatile memory device 106, such as a flash memory. Exemplary embodiments of flash memory include single level cell flash memory and multi-level cell flash memory. The processor 102 may be connected to dynamic memory, such as a random access memory (RAM) 104 that may store a mapping of the flash memory 140, bad blocks data 150, a CRC evaluation program 160, and, optionally, an ECC program. The mapping of the flash memory 140, bad blocks data 150, and the CRC evaluation program 160 may be stored in the RAM 104 or may be incorporated into the processor 102.

The memory device 106 is configured to store blocks of data that include pages or sectors, such as illustrative sectors 108, 110 and 112. Each sector of data (e.g. 108, 110 and 112) includes a user data area (120, 124 and 128) and a redundant memory area (122, 126 and 130). In one exemplary embodiment, the user data areas (120, 124 and 128) include user data and the redundant memory areas (122, 126 and 130) include system data. When the processor 102 is creating a map of the flash memory 140, the processor may access a first portion of the redundant memory and, using the CRC evaluation program 160, determine whether an error exists within the first portion of the redundant memory. If an error does not exist, the processor may continue to evaluate a subsequent block of memory. If an error exists, the processor may access a second portion of the redundant memory that includes an ECC code and perform an ECC check or perform an error correction on the redundant memory or the data sector as a whole.

In one exemplary embodiment, the dynamic memory includes instructions and logic to perform CRC and ECC operations, and to perform mapping and cataloging operations for mapping and cataloging memory blocks. For example, the dynamic memory may include logic and instructions operable by the processor to perform CRC operations, compare ECC codes, or perform error correction using ECC codes. In a further example, the system may store data identifying blocks in use, such as an address conversion table. In a further example, the dynamic memory includes mapping program logic executable by the processor to generate the data that represents the map of a region of the non-volatile memory. The map is generated in response to reading the first portions of the first redundant memory areas without reading the data sectors.

Figure 2:
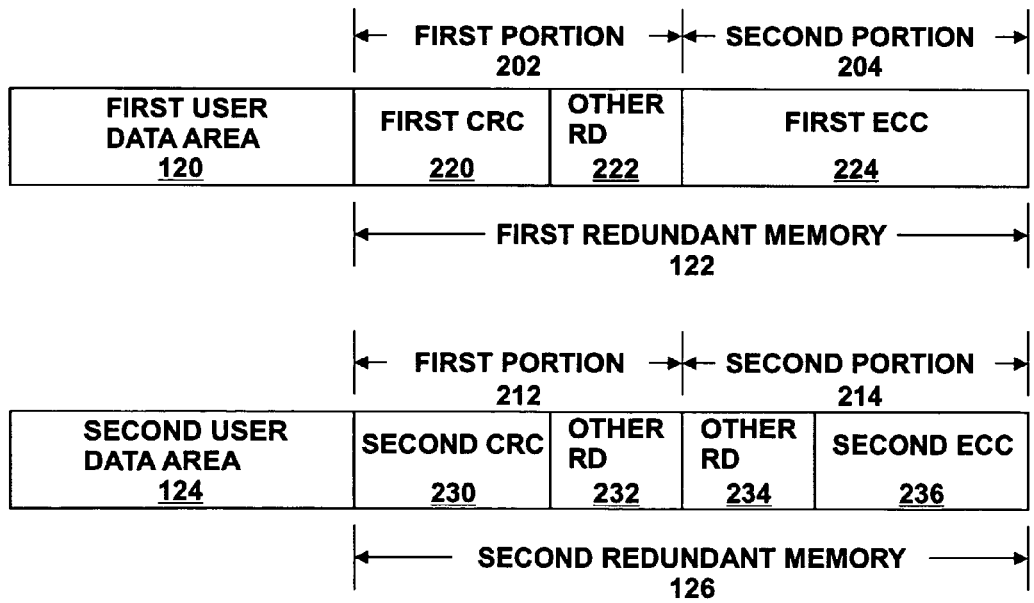
FIG. 2 is a block diagram illustrating an exemplary memory.

FIG. 2 depicts an exemplary memory device including two representative sectors or pages of data of the non-volatile memory. The first sector of data includes a first user data area 120 and a redundant memory area 122. The redundant memory area 122 is further divided into a first portion 202 and a second portion 204. The first portion 202 includes a first CRC code 220 and other redundant data 222. The second portion 204 includes a first error correction code (ECC) 224. Similarly, the second sector includes a second user data area 124 and a second redundant memory area 126. The second redundant memory area 126 is subdivided into a first portion 212 and a second portion 214. The first portion 212 includes a second CRC code 230 and other redundant data 232. The second portion 214 may include an error correction code (ECC) 206 and other redundant data 234. Generally, other redundant data areas (222, 232, and 234) may include system data and data useful for cataloging data blocks, such as overwrite flags, logical address data, format reserve data, security codes, data management flags, and tags identifying the kind of data in the sector. In one exemplary embodiment, overwrite flags include flags for indicating block status, page status, and update status. In one particular embodiment, the CRC codes 220 and 230 are associated with the overwrite flags and, in particular, the block status, page status, and update status flags. For example, the CRC codes (220 and 230) may be used to check for noise or errors in the overwrite flags, such as the block status, page status, and update status flags.

When evaluating sectors for errors, the system may read the first portion of the redundant memory, such as the first portion 202. The system may evaluate the first CRC code 220 in relation to the first portion 202 to determine whether an error is present. Upon detecting an error, the system may access the second portion 204 of the first redundant memory 122 to acquire a first error correction code (ECC) 224 and perform an ECC operation, such as an ECC check or error correction, on the complete data block including the first user data area 120.

Figure 3:
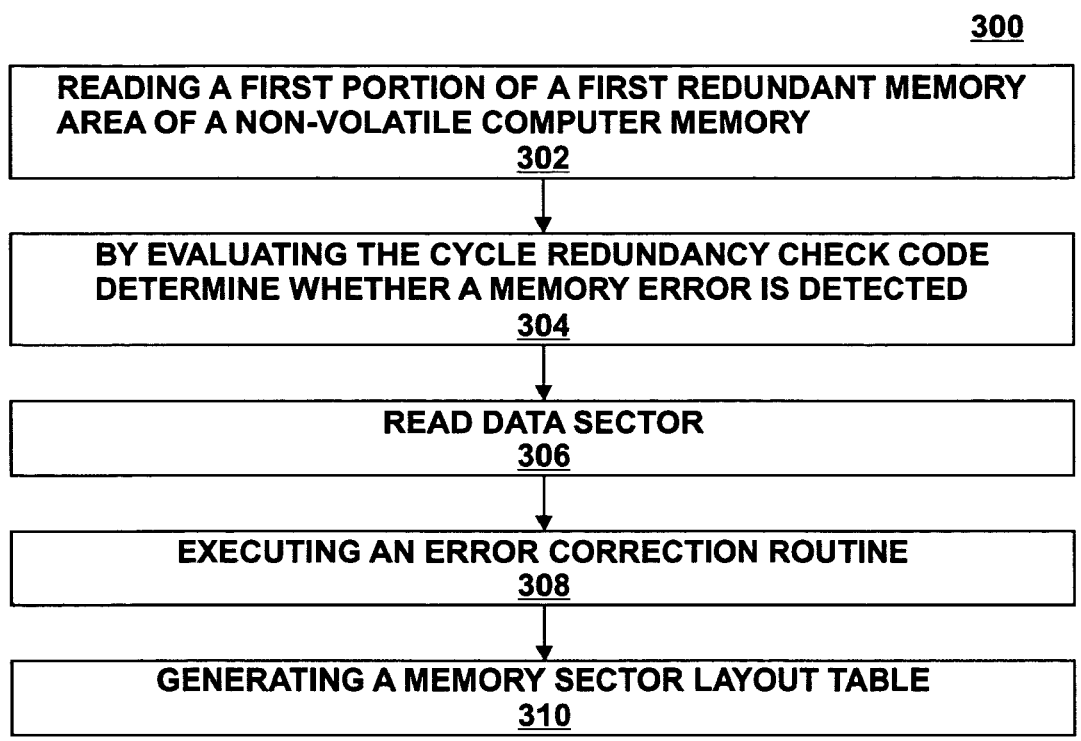

To create a mapping of the memory device, the system may read selected portions of the non-volatile memory. In one exemplary embodiment, the memory device is a flash memory device, such as a multi-level cell flash memory device. FIG. 3 is a flow diagram illustrating an exemplary method for reading selected portions of non-volatile memory. The method 300 includes reading a first portion of a redundant memory area of a page or sector of the non-volatile computer memory, as shown at step 302. The first portion may include data, such as system data, associated with a data sector within the non-volatile computer memory. The first portion of the redundant memory area may include a cyclic redundancy check code (CRC) code. In a particular embodiment, the redundant area is 16 bytes and the first portion of the redundant memory area is 7 bytes. In another exemplary embodiment, the user data area is 2048 bytes, the redundant area is 64 bytes, and the first portion of the redundant area is 28 bytes. The redundant area may also include a second portion that includes an error correction code (ECC). The system determines whether a memory error is detected, as shown at step 304, such as through evaluating the cyclic redundancy check (CRC) code in relation to the data of the first portion.

In another exemplary embodiment, the system may execute an error correction routine in response to detecting a memory error. For example, the memory device may read the whole data sector, as shown at step 306, generate an error correction code for comparison with a stored error correction code associated with the portion of the redundant data or perform ECC correction on the whole data sector, as shown at step 308. Alternatively, an ECC operation may be performed on the redundant memory area. In general, the time used to read the first portion of the redundant area and check the CRC is significantly less than the time to read and perform an ECC operation for the entire data sector.

As a result of these operations, the system may generate a memory sector layout table, as shown at step 310. The memory sector layout table may be stored in the microprocessor or in a random access memory (RAM) device. Alternatively, these operations may be used to check the value of security codes, to identify sectors having a particular tag, such as a tag identifying data type stored in a sector, or to create a map of bad or good data sectors or block.

In one exemplary embodiment, the non-volatile memory includes a plurality of pages. In one example, each page includes a user data area and a redundant memory area. For example, a first of the plurality of pages includes a first user data area and a first redundant memory area and a second of the plurality of pages includes a second user data area and a second redundant memory area. In one particular embodiment, the first redundant memory area and the second redundant memory area include system data and the first user data area and the second user data area include user data.

A method, as illustrated in FIG. 4, includes reading a first portion of a first redundant memory area of a first data sector of the non-volatile computer memory and reading a first portion of a second redundant memory area of second data sector of the non-volatile computer memory. The first redundant memory area includes system data associated with the first data sector within a non-volatile memory and the second redundant memory area includes system data associated with a second data sector within the non-volatile memory. The first portion of the first redundant memory area includes a first cyclical redundancy check (CRC) code associated with the first portion of the first redundant memory area. The first portion of the second redundant memory area includes a second cyclical redundancy check code associated with the first portion of the second redundant memory area. In one exemplary embodiment, the first portion of the first redundant memory area and the first portion of the second redundant memory area may further include logical address data, format reserve data, and data management flags.

The system may read a first portion of a first redundant memory area, as shown at step 402 of FIG. 4, and determine whether the memory has errors, as shown at step 404. For example, the system may evaluate the first CRC code to determine whether the first portion of the first redundant memory area has errors. In addition, the system may read the first portion of the second redundant memory area, as shown at step 406, to determine whether a memory error is detected in the second redundant memory area, as shown at step 408.

FIG. 5 depicts a flow diagram illustrating an additional method for reading non-volatile memory. The method 500 includes reading a first portion of a redundant memory area of a sector or page of a non-volatile computer memory, as shown at step 502. The redundant memory area is associated with the sector within the non-volatile computer memory. The first portion of the redundant memory area includes a first error correction code (ECC) associated with the first portion of the redundant memory area, and a second portion includes a second error correction code (ECC) associated with the data sector. In one particular embodiment, the first portion of the redundant memory area includes overwrite flags, such as block status, page status, and update status flags. The first ECC may be used to detect errors and noise and correct errors and noise in the overwrite flags. In another exemplary embodiment, the first portion of the redundant memory area includes one or more of the overwrite flags, management flags, logical address information, a security code, and tags identifying the kind of data in the sector. The first ECC may be used to detect and correct errors in the first portion.

The method further includes performing error detection or correction using the first error correction code, as shown at step 504. For example, error detection may be performed on the redundant memory area or portions thereof, such as the first portion, using the first ECC. When an error condition is detected, the first ECC may be used to correct the redundant memory area or a second ECC stored in the second portion of the redundant memory area is used to perform an error detection and/or error correction on the data sector, as shown at step 506.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of reading a portion of a non-volatile computer memory, the method comprising:
   reading a first portion of a redundant memory area of a data sector of a non-volatile computer memory, the first portion of the redundant memory area including data associated with the data sector;
   wherein the first portion of the redundant memory area includes a cyclic redundancy check code;
   evaluating the cyclic redundancy check code to detect a memory error with respect to the first portion, wherein an overwrite flags include a block status flag, a page status flag and an update status flag in the redundant memory area is checked by the cyclic redundancy check code;
   reading a second portion of the redundant memory area in response to detection of the memory error; and
   wherein the non-volatile computer memory comprises a multi-level cell flash memory device.

2. The method of claim 1, wherein the second portion of the redundant memory area includes an error correction code.

3. The method of claim 1, further comprising reading the data sector after detecting the memory error and executing an error correction routine in response to detecting the memory error.

4. The method of claim 3, wherein reading the second portion of the redundant memory area comprises reading an error correction code from the second portion of the redundant memory area prior to executing the error correction routine.

5. The method of claim 1, further comprising generating a memory sector layout table based on that data included within the first portion of the redundant memory area.

6. The method of claim 5, wherein the memory sector layout table is stored in a random access memory device.

7. The method of claim 1, further comprising building a map of bad sectors based on the data included within the first portion of the redundant memory area.

8. The method of claim 1, further comprising identifying a type of data stored in a sector based on that data included within the first portion of the redundant memory area.

9. The method of claim 1, further comprising checking the value of a security code based on that data included within the first portion of the redundant memory area.

10. The method of claim 1, wherein the first portion of the redundant memory area includes data selected from a group consisting of overwrite flags, logical address data, format reserve data, security codes, data management flags, and tags identifying the kind of data in the sector, and wherein the overwrite flags include a block status flag, a page status flag, and an update status flag.

11. The method of claim 1, wherein the redundant memory area is sixteen bytes and wherein the first portion of the redundant memory area is seven bytes.

12. The method of claim 1, wherein the redundant memory area is sixty four bytes and wherein the first portion of the redundant memory area is twenty eight bytes.

13. The method of claim 1, wherein the time to read the first portion of the redundant memory area and to evaluate the cyclic redundancy check is less than the time to read the data sector and to perform an error correction code operation using the error correction code.

14. A method of reading a non-volatile computer memory, the method comprising:
reading a first portion of a first redundant memory area of a first data sector of a non-volatile computer memory, the first redundant memory area including data associated with the first data sector, the first portion of the first redundant memory area including a first cyclic redundancy check code associated with the first portion of the first redundant memory area;
evaluating the first cyclic redundancy check code to determine whether noise or errors exist in an overwrite flags include a block status flag, a page status flag and an update status flag present in the first portion of the first redundant memory area;
reading a first portion of a second redundant memory area of a second data sector of the non-volatile computer memory, the second redundant memory area including data associated with the second data sector, the first portion of the second redundant memory area including a second cyclic redundancy check code; and
wherein the non-volatile computer memory comprises a multi-level cell flash memory device.

15. The method of claim 14, wherein the first redundant memory area includes a first error correction code stored in a second portion of the first redundant memory area, and wherein the second redundant memory area includes a second error correction code stored in a second portion of the second redundant memory area.

16. The method of claim 15, further comprising evaluating the first cyclic redundancy check code to determine whether a memory error is detected with respect to the first portion of the first redundant memory area, and evaluating the second cyclic redundancy check code to determine whether a memory error is detected with respect to the first portion of the second redundant memory area.

17. The method of claim 14, wherein the data associated with the first data sector and the data associated with the second data sector include data selected from a group consisting of logical address data, format reserve data, and data management flags.

18. The method of claim 14, wherein the non-volatile memory includes a plurality of blocks, a first of the plurality of blocks including the first data sector and a second plurality of blocks including the second data sector.

19. The method of claim 14, wherein the first redundant memory area and the second redundant memory area include system data and wherein the first data sector and the second data sector further include user data.

20. A non-volatile computer memory device comprising:
a multi-level cell flash memory device comprising:
a first memory element including a first user data and a first redundant memory, the first redundant memory including a first portion and a second portion, the first portion of the first redundant memory including a first cyclic redundancy check code and the second portion of the first redundant memory including a first error correction code, wherein the first cyclic redundancy check code is associated with error detection of data stored in the first portion of the first redundant memory, wherein an overwrite flags include a block status flag, a page status flag and an update status flag is present in the first portion of the first redundant memory, and wherein the first cyclic redundancy check code is configured to check the overwrite flag; and
a second memory element including a second user data and a second redundant memory, the second redundant memory including a first portion and a second portion, the first portion of the second redundant memory including a second cyclic redundancy check code and the second portion of the second redundant memory including a second error correction code.

21. The non-volatile computer memory device of claim 20, wherein the first error correction code is associated with error correction of data stored in the first user data and in the first redundant memory.

22. A system comprising:
a processor;
a dynamic memory accessible to the processor; and
a non-volatile memory comprising a multi-level cell flash memory device accessible to the processor, the non-volatile memory comprising:
a first memory element including a first user data and a first redundant memory, the first redundant memory including a first portion and a second portion, the first portion of the first redundant memory including a first cyclic redundancy check code and the second portion of the first redundant memory including a first error correction code, wherein an overwrite flags include a block status flag, a page status flag and an update status flag is present in the first redundant memory that is capable of being checked by the first cyclic redundancy check code; and
a second memory element including a second user data and a second redundant memory, the second redundant memory including a first portion and a second portion, the first portion of the second redundant memory including a second cyclic redundancy check code and the second portion of the second redundant memory including a second error correction code.

23. The system of claim 22, wherein the dynamic memory includes data that represents a map of a region of the non-volatile memory, the region of the non-volatile memory including the first memory element and the second memory element.

24. The system of claim 23, wherein the dynamic memory includes mapping program logic executable by the processor to generate the data that represents the map of the region of the non-volatile memory and wherein the map is generated in response to reading the first portion of the first redundant memory and in response to reading the first portion of the second redundant memory, and without reading the first user data and without reading the second user data.

25. The system of claim 22, wherein the dynamic memory includes program logic executable by the processor to evaluate the first cyclic redundancy check code to detect an error within the first memory element, and wherein the dynamic memory further includes program logic executable by the processor to correct the error within the first memory element using the first error correction code.

\* \* \* \* \*